Figure 1:
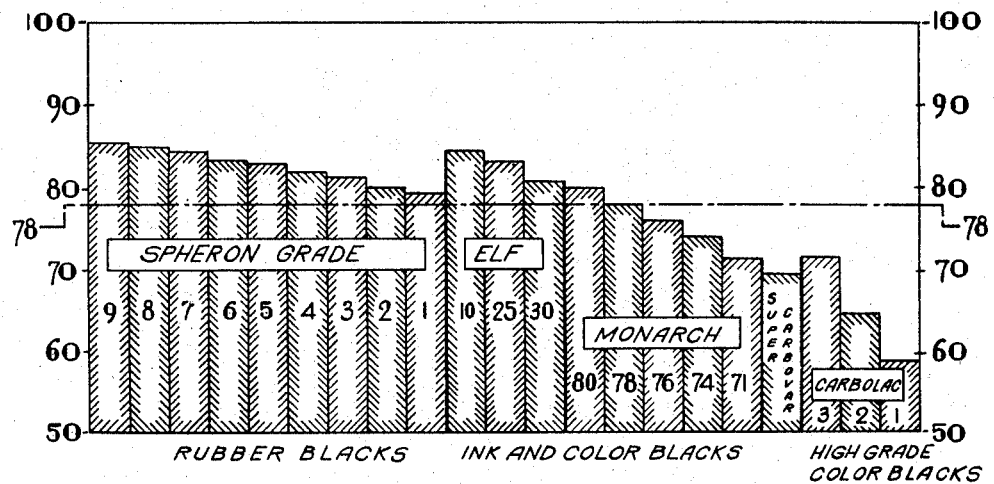

Feb. 4, 1947. O. J. BROWN, JR 2,415,072
CARBON BLACK PRODUCT AND PROCESS OF PRODUCING THE SAME
Filed Aug. 15, 1941

INVENTOR.
Owen J. Brown, Jr.
BY Kenway & Witter Attys

Patented Feb. 4, 1947

2,415,072

UNITED STATES PATENT OFFICE 2,415,072

CARBON BLACK PRODUCT AND PROCESS OF PRODUCING THE SAME

Owen J. Brown, Jr., Malden, Mass., assignor to Godfrey L. Cabot, Inc., Boston, Mass., a corporation of Massachusetts Application August 15, 1941, Serial No. 407,013

3 Claims. (Cl. 23—209.2)

This invention consists in a novel process of making a special carbon black having a fast filter rate and high decolorizing properties that give it value in various industries. The invention also includes within its scope the novel carbon black product having these properties herein shown as produced by the process of my invention.

It has been appreciated for many years that certain types of impingement carbon blacks have limited decolorizing properties, but prior to my invention it has been impractical to use carbon black in its natural flocculent form for such purposes because of its extremely slow filter rate and the great difficulty of separating it from any liquid mixture in which it may be contained. In general, therefore, charcoal or lignite activated by differential oxidation has been employed in sugar refining and certain industries where decolorizing or other purifying or filtering operations are required.

The object of the present invention is to provide a special carbon black having novel and highly desirable characteristics or properties in respect to filter rate and decolorizing capacity and adapted by reason of them to perform successfully the functions for which activated charcoal and the like have been previously utilized.

My invention is based upon the discovery that impingement carbon black selected within a certain critical range of color intensity and treated by being first converted to a dense granular or pelletized form and then broken down into powder possesses these desired valuable characteristics.

For many years impingement carbon black has been graded in accordance with the intensity of its color as determined by the "Cabot Nigrometer." The intensity of color is a reliable guide indicating the properties which may be expected when a particular grade of carbon black is used in compounding rubber or ink. The nigrometer is calibrated in a logarithmic but arbitrary scale from 50 to 90, the lower index figures indicating the greater intensity or depth of blackness and the scale index 59 indicating substantially the most intense color recorded hitherto. Carbon black samples for grading in the nigrometer are prepared by mulling carbon black and linseed oil varnish on a rub-up board and then spreading upon a glass slide. The sample is then viewed under monochromatic light against a background variably illuminated to a degree indicated by the Nigrometer scale.

I have discovered that by selecting carbon black having a color intensity at least as intense as that indicated by the index 78, or carbon black lying in the limited range 59–78 of the Nigrometer scale, and treating this selected carbon black as below outlined, the product unaccountably and unpredictably takes on the properties of good filter rate and high decolorizing capacity.

Figure 2:
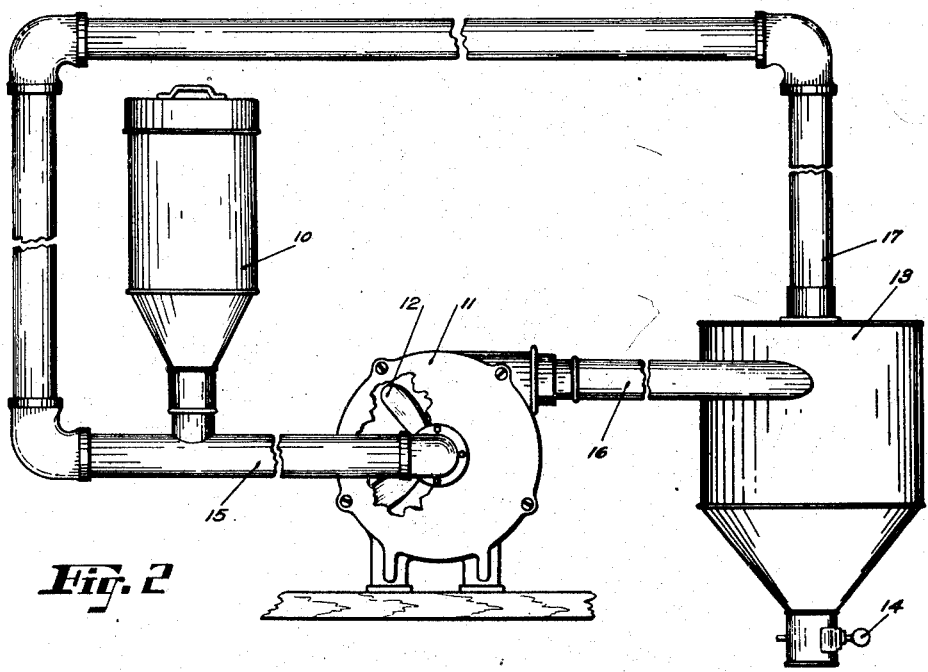

The nature and scope of my invention will be best understood and appreciated from the following description of a preferred manner of practicing the process of my invention in producing carbon black particularly adapted for decolorizing sugar syrups and liquors in the sugar refining industry. In the accompanying drawing, Fig. 1 is a diagrammatic view graphically illustrating the color intensity of various grades of commercial carbon blacks and indicating the critical range from which the raw material of my process must be drawn, and Fig. 2 is a view in elevation suggesting more or less diagrammatically one form of apparatus suitable for breaking down the granular carbon black into the required powdered form.

The raw material employed in carrying out my novel process for producing carbon black of fast filter rate and high decolorizing properties consists preferably of dry flocculent carbon black manufactured from natural gas by the impingement process and selected from that source and within a critical range of color intensity. A number of standard carbon blacks available on the market as commercial products are graphically indicated in Fig. 1 of the drawing. The orderly variation of each of the groups of these grades is indicated as they are commercially rated in the industry by the Cabot Nigrometer. The figures placed at the ends of the diagram are the index figures of the Nigrometer scale. Variations in the depth of the black color shade away from the deepest black corresponding to index 59 to a grayish tinge indicated by the index 85. Each decrement of blackness is a quantity indicated by one additional division upon the Nigrometer scale. Of the commercial carbon blacks included in Fig. 1 it will be seen at once that of the nine Spheron grades none is suitable material for purposes of the present invention. Of the Elf group no grade is sufficiently black to be used. Of the Monarch group grades 71, 74, 76 and 78 are suitable. The grade known commercially as "Super Carbovar" having a color intensity of less than 70 is suitable. Of the Carbolac group grades, 1, 2 and 3 are suitable.

Having selected a suitable grade of flocculent carbon black from within the proper critical range of color intensity, the next step of the process consists in converting the flocculent carbon black into a denser pelletized or granular form. Starting with flocculent carbon black having an apparent density of less than 14 lbs. per cubic foot the material may be converted by turbulent agitation in the dry state into a mass of relatively dense, coherent, substantially dustless granules having an apparent density of above 18 lbs. per cubic foot. The granules or pellets are generally spherical in shape, between 20 and 200 mesh in size and comprise homogeneous carbon black, free of extraneous binder material. They are discrete and sufficiently stable and sturdy in structure to withstand handling in bulk without substantial disintegration. The process of thus converting carbon black from flocculent to granular condition is disclosed in detail in U. S. Letters Patent No. 2,120,541 granted June 14, 1938, on an application of Billings and Offutt.

While the dry process above described is to be preferred for some reasons, the precise method of conversion is of secondary importance only. If desired and within the scope of the invention, the conversion may be effected by the spraying or atomizing and stirring process of U. S. Patent No. 2,228,704 granted January 14, 1941, on an application of Offutt, or by any other wet or dry process known to the industry. The granular carbon black thus produced may be activated and employed as a filter medium all as explained in U. S. Letters Patent No. 2,317,026 granted upon a copending application, filed by the present inventor jointly with Walter R. Smith, but the filter rate of such granular carbon black is so rapid as to be unsatisfactory and a much more useful product is reached by proceeding in accordance with my invention and breaking down the granules into powdered form. This step may also be carried out in any desired manner, as, for example, that suggested in Fig. 2 where the granular carbon black is poured continuously into the air current passing through a high-speed fan. In passing through the zone of blade rotation the granules produced as heretofore outlined may be quickly and completely broken down into fragments in the form of carbon black powder. This has an apparent density somewhat higher than the apparent density of the granular mass from which it has been formed. For example, if the initial apparent density of the granular pellets was 18 lbs. per cubic foot, the apparent density of the resulting powder may be 20 lbs. per cubic foot.

The apparatus shown in Fig. 2 includes a hopper 10, to which the granular carbon black is supplied in bulk, a rotary motor-driven fan 11 having blades 12, and a delivery hopper 13 in which the product is collected and from which it may be drawn off by manipulating a valve 14 in the lower end of the hopper. A closed system of piping connects the two hoppers and the fan. An air current is maintained in the pipe section 15 which acts to convey granular carbon black from the hopper 10 to the fan 11. In passing through the fan the granular carbon black is reduced to the form of a fine powder and is delivered through the pipe section 16 to the hopper 13. Here the powder settles out of the air current and the air, now freed of its burden, passes upwardly into the vertical pipe section 17 and thence back to the section 15 where it picks up its load. The breaking down process is continuous, of course, so long as granular carbon black is maintained in the hopper 10. No substantial color change is observable in carrying out the steps of the process above set forth, the resulting powder retaining the color intensity of the original flocculent carbon black or even increasing somewhat in color intensity.

The texture of the powder comprising the final product is readily to be distinguished from that of the original flocculent carbon black. In the first place its density is much greater, for example 20 lbs. per cubic foot, as compared to 14 lbs. or less for the flocculent carbon black and about 18 lbs. for the intermediate granular product. The characteristic spherical shape of the intermediate product has been destroyed, except possibly in respect to fines below 200 mesh in size. Further, the dusty characteristics of the powdered product are reduced as compared to the original flucculent carbon black.

The powdered product produced as above outlined will be found to have a very satisfactory filter rate or flow rate and high decolorizing capacity in association with sugar syrup. For example, it has an efficiency of 100% or better as compared with the standard decolorizing mediums now available in the market at greater cost. It is moreover, useful in many decolorizing and deodorizing fields, such as removing fats, oils and dye stuffs from chlorinated solutions, for bleaching glycerine and for water purification, etc.

It will be noted that the novel carbon black product of my invention is prepared without the necessity of subjecting the raw material to any activating operation. This is advantageous because it obviates the substantial losses of carbon black by combustion which are always encountered in heating carbon black to activating temperatures.

While it is desirable to start with carbon black of the color intensity specified above it may be possible in some cases to increase the color intensity of a less black raw material during the process and so to arrive at a powdered carbon black within the critical 59–78 range, as indicated by Nigrometer scale. Such procedure and product are included within the scope of my invention.

Claims presented herein are directed to dry process procedure in carrying out the invention and the corresponding product. Generic claims have been transferred to my co-pending application Ser. No. 604,713 which also contains claims to wet process procedure for carrying out the invention and the corresponding product.

Having thus disclosed my invention and described in detail the best process now known to me of putting into practice, I claim as new and desire to secure by Letters Patent:

1. The process of making carbon black having a fast filter rate and high decolorizing properties, which includes the steps of converting the dry flocculent carbon black of a color intensity between 59 and 78, as indicated by Nigrometer scale, into substantially spherical granules between 200 mesh and 20 mesh in diameter, free of binder and having smooth, impact-formed, non-adherent surfaces and dense sturdy structure built up progressively and systematically by application of turbulent pressure to the dry carbon black and having an apparent density of more than 12 lbs. per cubic foot, and then breaking down the said granular carbon black while moving continuously in a current of air into a fine powder having a greater apparent density than the carbon black in its granular form and at least the same intensity of color.

2. The process of making carbon black having a fast filter rate and high decolorizing properties, which includes the steps of selecting a dry flocculent carbon black of a color intensity between 59 and 78, as indicated by Nigrometer scale, converting it into a mass of dense, sturdy, substantially dustless granules by the systematic application of turbulent pressure to the dry flocculent carbon black, and conveying said granules in an air current while reducing them to powdered fragments, and meanwhile maintaining at least the same color intensity of the product as that of the original flocculent carbon black.

3. A new carbon black product having a fast filter rate and high decolorizing properties, and consisting in powdered carbon black produced by first converting flocculent carbon black of a color intensity at least that indicated by Nigrometer Index 78 into granular form by the systematic application of turbulent pressure to the dry flocculent carbon black, and then breaking down such granules into powdered form.

OWEN J. BROWN, Jr.

REFERENCES CITED

The following references are of record in the file of this patent:

UNITED STATES PATENTS

| Number | Name | Date |
|---|---|---|
| 2,187,601 | Glaxner | Jan. 16, 1940 |
| 2,213,059 | Teegerstrom | Aug. 27, 1940 |
| 2,164,164 | Price | June 27, 1939 |
| 2,167,674 | Offutt | Aug. 1, 1934 |
| 2,120,540 | Billings | June 14, 1938 |
| 2,178,382 | Wiegand | Oct. 31, 1939 |
| 2,228,704 | Offutt | Jan. 14, 1941 |
| 1,516,337 | Cumming | Nov. 18, 1924 |